United States Patent

Goodman et al.

Patent Number: 5,252,223
Date of Patent: Oct. 12, 1993

[54] REDUCTION OF COPPER DISCHARGE TO WASTE STREAMS CONTAMINATED WITH ISOTHIAZOLONE BIOCIDES

[75] Inventors: Walter H. Goodman, Lisle; Nicholas J. Furibondo, Naperville, both of Ill.

[73] Assignee: Nalco Chemical Company, Naperville, Ill.

[21] Appl. No.: 980,029

[22] Filed: Nov. 23, 1992

[51] Int. Cl.⁵ ............................................. C02F 1/42
[52] U.S. Cl. .................................. 210/688; 210/764; 210/912; 162/161; 106/15.05
[58] Field of Search ............... 162/161; 210/764, 688, 210/912; 106/15.05

[56] References Cited

U.S. PATENT DOCUMENTS

| | | | |
|---|---|---|---|
| 4,303,704 | 12/1981 | Courduvelis et al. | 210/688 |
| 4,824,575 | 4/1989 | Schlossel | 210/688 |
| 5,108,500 | 4/1992 | Mattox | 106/2 |

Primary Examiner—Stanley S. Silverman
Assistant Examiner—Cynthia L. Nessler
Attorney, Agent, or Firm—Robert A. Miller; John G. Premo; James J. Drake

[57] ABSTRACT

The discharge of copper from isothiazolone biocides into industrial waste water streams is prevented by contacting the isothiazolone biocide as it is withdrawn from a point of use storage container with an ion exchange resin capable of removing copper from aqueous solutions. When the treated isothiazolone biocide is added to an industrial process water which will produce waste stream, potential copper contamination is virtually eliminated.

11 Claims, 1 Drawing Sheet

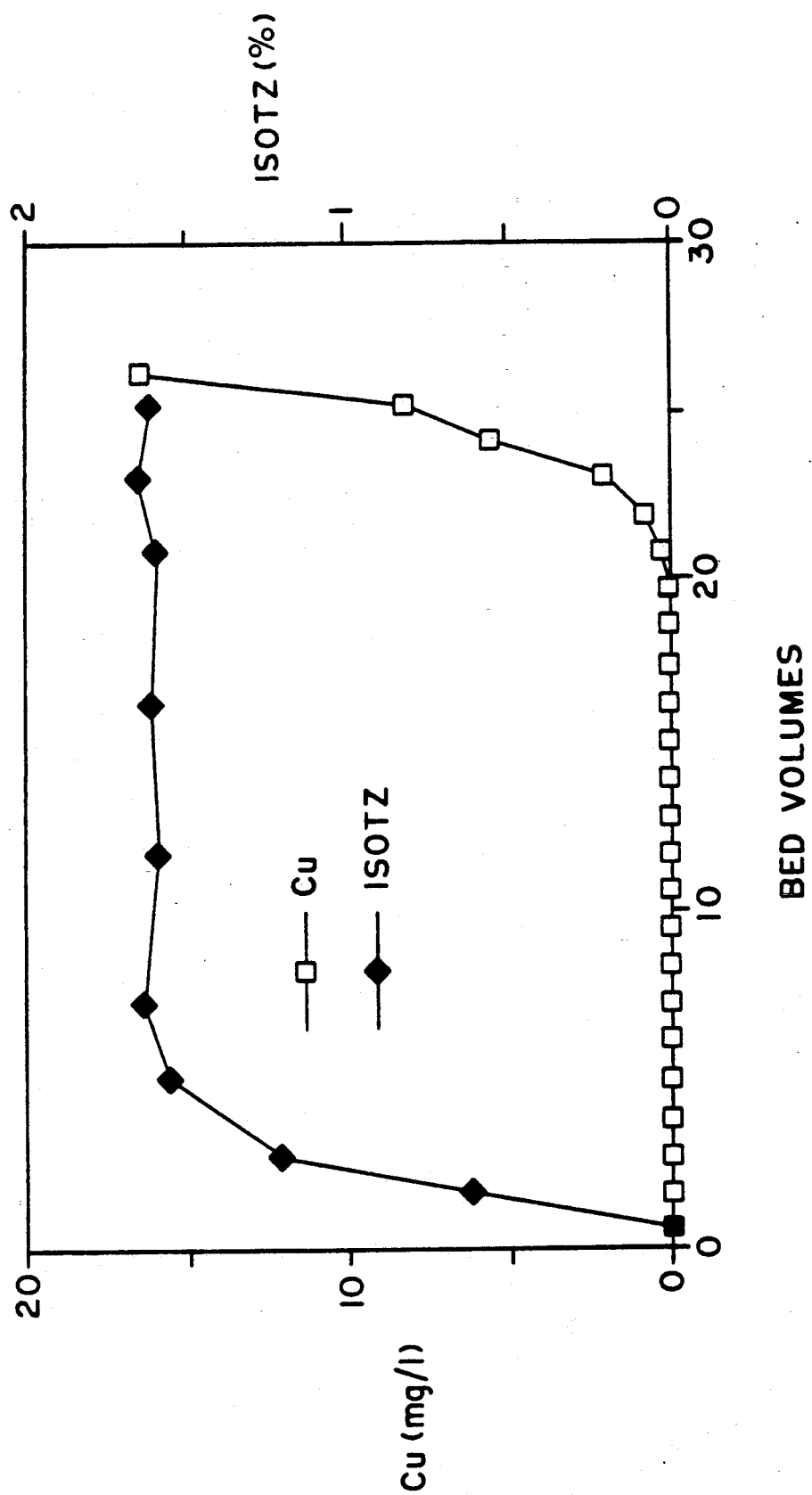

REDUCTION OF COPPER DISCHARGE TO WASTE STREAMS CONTAMINATED WITH ISOTHIAZOLONE BIOCIDES

BACKGROUND OF THE INVENTION

1. Field of the Invention

The invention is concerned with preventing the discharge of copper resulting from the degration of isothiazolone biocides into industrial waste water streams.

2. Description of the Prior Art

Isothiazolone biocides are used to treat a variety of industrial process waters such as cooling tower waters, refinery process waters and the like to control the growth of microorganisms. They are also used extensively in treating paper mill process waters.

Aqueous solutions of isothiazolone biocides tend to break down under conditions of long term storage. To control this decomposition, manufacturers add copper ion in the form of a water soluble cupric salt, such as cupric nitrate, as a stabilizing agent. The amount of copper ion present in the isothiazolone solutions typically is between 0.1 to 0.2% by weight. In certain instances the isothiazolones contain small amounts of magnesium compounds, which are a manufacturing residue.

These process waters eventually become part of industrial waste water streams. Copper is deemed by most environmental regulations to be an undesirable pollutant in waste water streams, even if present in small quantities. The copper-stabilized isothiazolone biocides present in industrial process waters could add copper ion to the waste streams in potentially unacceptable amounts.

If it were possible to treat industrial process waters with copper-stabilized isothiazolone biocides whereby copper ion formed from these isothiazolone would not be added to the waste streams an advance in the art would be afforded. It would also be advantageous for the prevention of magnesium ions contained in isothiazolone biocides from contaminating waste water streams.

SUMMARY OF THE INVENTION

The invention comprises a method for preventing the discharge of copper into industrial waste water streams, which copper is present in isothiazolone biocides used to treat industrial process waters which provide the source for industrial waste water streams. Specifically, the invention comprises contacting an aqueous solution of an isothiazolone biocide as it is withdrawn from a storage container with an ion exchange resin capable of removing copper from aqueous solutions and then adding the treated isothiazolone biocide solution to the industrial process water.

BRIEF DESCRIPTION OF THE DRAWINGS

FIG. 1 illustrates a comparison of the effectiveness of Applicants' invention in reducing the copper ion content of aqueous solutions of isothiazolone bactericidal solutions at varying bed volumes.

DETAILED DESCRIPTION OF THE PREFERRED EMBODIMENT

The Isothiazolone Biocide

Isothiazolones used in the practice of Applicants' invention are also known as the biocidally active 2-methyl-4-isothiazoline-3-one compounds. These compounds are described in U.S. Pat. No. 4,539,071 which is incorporated herein by reference. The isothiazolones may have either a hydrogen atom or a halogen atom, such as chlorine, substitited on the ring at the 5 position. The commercial isothizolones most often used to treat industrial process waters are a blend of the 5-chloro and 5-H substituted isothiazolones. Typically the ratio of the chloro substituted to hydrogen substituted isothiazolone is between 2–3.5:1. The commercial isothiazolone biocide tested in the following Example was an aqueous solution containing 1.15% by weight of 5-chloro-2-methyl-4-isothiazoline-3-one and 0.35% by weight of 2-methyl-4-isothiazoline-3-one. It had been preserved with between 0.1–0.15% by weight of cupric ion. The isothiazolone biocides to be treated by the method of Applicants' invention should be in the form of aqueous solutions having an isothiazolone concentration of between about 0.5% up to as much as 8–10% by weight. Preferably, the concentration of the isothiazolone should not exceed about 4% and most preferably it should not exceed 3%.

The Ion Exchange Resins

Any ion exchange resin capable of removing copper ions from aqueous solutions may be used to practice the process of the invention. Typical of such resins are the well known cation exchange resins illustrated by the sulfonated copolymers of styrene and divinylbenzene. Another group of cation exchangers that may be used are the carboxylate-containing resins which are illustrated by the cross-linked acrylate resins. In a similar fashion, it is possible to employ the inorganic cation exchangers of the alumino-silicate type, preferably the so-called crystalline alumino silicate exchangers. While any of these exchangers may be used, it is preferred to employ a chelating ion exchange resin which is capable of chelating copper ion. Preferred for use in the practice of this invention is the styrene-divinylbenzene iminodiacetate resin sold by Rohm and Haas under the trade designation, IRC-718. The properties and characteristics of this resin are presented in the publications Amberlite IRC-718 Product Bulletins, May 1988 and June 1982. This resin is capable of use either in the alkali metal salt form or the hydrogen form. Regeneration of the resin after use may be accomplished using a mineral acid solution such as hydrochloric acid after use.

The resins may be used as a batch treatment or in the preferred form of a conventional ion exchange column. While treatment of the isothiazolone biocide solutions is conventional with respect to flow rates, regeneration and backwash procedures it should be noted that it is good practice to treat the resin after exhaustion with a 5–20% by weight solution of sodium bisulfite to decontaminate any isothiazolone that may be associated with the resin.

Treatment of the Isothiazolone Biocide at the Point of Use Storage Container Isothiazolone biocides are usually added to industrial process waters from storage vessels located at the intended point of addition. Illustrative of the storage vessels are the Porta-Feed ® containers, manufactured by Nalco Chemical Company, which are described in U.S. Pat. Nos. 4,746,034 and 5,016,666, the disclosures of which patents are incorporated herein by reference. The Porta-Feed units have a capacity ranging from between 55 gallons to 400 hundred gallons, and hence are amenable to having their contents treated by a small ion exchange unit. The ion exchange treatment of the copper-stabilized isothiazolone biocide is conducted at a place near the storage container. Most often it will be conducted in an area between the storage container and the location in the process water system where the isothiazolone biocide is to be fed. As indicated, the ion exchange operation is preferably conducted using an ion exchange column. It is contemplated that the ion exchange column and its supporting units, e.g. regenerant storage tanks, flow meters, pumps, valves, discharge lines, backwash supply lines and other related pieces of equipment would be in the form of an integrated skid-mounted unit that may be moved to the immediate vicinity of the storage vessels. Preferably, the ion exchange column is attached to the output of the storage vessel which contains the isothiazolone. In this way, Applicants' method can be carried out simultaneous with dispensing the stored isothiazolones. Preferably, two ion exchange columns will be arranged in parallel on one storage vessel. The employment of two parallel flow columns allows for regeneration of one column while the other is on line treating the copper-containing isothiazolone biocide.

After receiving the ion exchange treatment the isothiazolone biocide is fed to the industrial process water to be treated. If short term storage of the isothiazolone biocide is required, it should not be for more than about 24 hours. Applicant's invention produces an ion-exchanged isothiazolone biocide that is substantially copper free, e.g. less than 0.05 mg./l. The ion exchange treatment does not affect the activity of the isothiazolone biocide nor does decomposition occur. In those cases where the isothiazolone biocide contains traces of magnesium ions, the ion exchange treatment reduces these metal values to a very low level.

EXAMPLE

Test conditions were chosen to simulate the highest flow rate conditions expected in the field. To handle the amount of copper present in a 200 gallon Porta-Feed tank requires 1.1 cu/ft of IRC-718 resin, assuming 0.12% Cu in the isothiazolone biocide and a theoretical resin capacity 31.8 g Cu per liter resin, 1 eq/l. The maximum anticipated flow rate of 1875 ml/min (0.5 gpm) corresponds to 0.50 gpm per cu/ft of resin.

FIG. 1 shows the breakthrough of copper in the commercial isothiazolone biocide and the effective removal of the copper therefrom. The desired level of copper leakage will determine the quantity of resin required. At 10 mg/l leakage, the effective resin capacity was 20 g Cu/l (0.63 eq/l). Analysis found there was no loss of active ingredients in the isothiazolone biocide. Both the chloro and non-chloro isomers were unchanged.

The invention is claimed as follows:

1. A method for preventing the discharge of copper from copper-stabilized isothiazolone biocides used to treat industrial process waters into industrial waste water streams which comprises the steps of:
    contacting an aqueous solution of a copper-stabilized isothiazolone biocide as it is withdrawn from a storage container with an ion exchange resin capable of removing copper from aqueous solutions; and
    adding the treated isothiazolone biocide solution to the industrial process water.

2. The method of claim 1 where the industrial process water comprises a paper mill waste water stream.

3. The method of claim 1 wherein the ion exchange resin is contained in two parallel in exchange columns.

4. The method of claim 1 where the ion exchange resin comprises a chelating resin.

5. The method of claim 4 where the chelating resin comprises a styrene-divinylbenzene iminodiacetate resin.

6. The method of claim 1 wherein the ion exchange resin is contained in an ion exchange column.

7. The method of claim 6 wherein the ion exchange column is an integral component of the storage container.

8. The method of claim 6 further comprising the step of regenerating the ion exchange resin with a mineral acid solution.

9. The method of claim 8, wherein the mineral acid contained in the mineral acid solution comprises hydrochloric acid.

10. A method for preventing the discharge of copper from isothiazolone biocides used to treat process waters into paper mill waste water streams which comprises the steps of:
    contacting an aqueous solution of an isothiazolone biocide as it is withdrawn from a storage container with a styrene divinylbenzene iminodiacetate ion exchange resin to remove substantially all the copper;
    and adding the treated isothiazolone biocide solution to the paper mill waste water streams.

11. The method of claim 5 where the isothiazolone biocide is an aqueous solution containing 1.15% by weight of 5-chloro-2-methyl-4-isothiazoline-3-one and 0.35% by weight of 2-methyl-4-isothiazoline-3-one having a copper content within the range of 0.1 to 0.15% by weight.

* * * * *